(12) United States Patent
Takiguchi

(10) Patent No.: US 10,295,812 B2
(45) Date of Patent: May 21, 2019

(54) LIGHT IRRADIATION DEVICE

(71) Applicant: HAMAMATSU PHOTONICS K.K., Hamamatsu-shi, Shizuoka (JP)

(72) Inventor: Yuu Takiguchi, Hamamatsu (JP)

(73) Assignee: HAMAMATSU PHOTONICS K.K., Hamamatsu-shi, Shizuoka (JP)

(*) Notice: Subject to any disclaimer, the term of this patent is extended or adjusted under 35 U.S.C. 154(b) by 133 days.

(21) Appl. No.: 15/639,801

(22) Filed: Jun. 30, 2017

(65) Prior Publication Data
US 2017/0307865 A1    Oct. 26, 2017

Related U.S. Application Data

(63) Continuation of application No. 14/441,981, filed as application No. PCT/JP2013/078986 on Oct. 25, 2013, now Pat. No. 9,739,992.

(30) Foreign Application Priority Data

Nov. 12, 2012   (JP) ................................ 2012-248443

(51) Int. Cl.
*G02B 21/06* (2006.01)
*G02B 13/22* (2006.01)
(Continued)

(52) U.S. Cl.
CPC ............ *G02B 21/06* (2013.01); *B23K 26/067* (2013.01); *B23K 26/0624* (2015.10); (Continued)

(58) Field of Classification Search
CPC ..... G02F 1/00; G02F 1/01; G02F 1/29; G02F 1/35; G02F 1/13; G02F 1/133; G02F 1/133526; G02F 1/08; G02F 1/1876
(Continued)

(56) References Cited

U.S. PATENT DOCUMENTS 8,203,788 B2 * 6/2012 Gluckstad .......... G02B 27/0927
359/279
2004/0246454 A1   12/2004 Ishikawa et al.
(Continued)

FOREIGN PATENT DOCUMENTS

CN           100470298 C    3/2009
CN           101712100 A    5/2010
(Continued)

OTHER PUBLICATIONS

S. Hasegawa et al., "Holographic femtosecond laser processing with multiplexed phase Fresnel lenses", Optics Letters, vol. 31, No. 11, 2006, p. 1705-p. 1707.

*Primary Examiner* — Robert E. Tallman
(74) *Attorney, Agent, or Firm* — Drinker Biddle & Reath LLP

(57) ABSTRACT

A light irradiation device is an apparatus for irradiating an irradiation object, and includes a light source outputting readout light L1, a spatial light modulator modulating the readout light L1 in phase to output modulated light L2, and a both-sided telecentric optical system including a first lens optically coupled to a phase modulation plane of the spatial light modulator and a second lens optically coupled between the first lens and the irradiation object, and optically coupling the phase modulation plane and the irradiation object. An optical distance between the phase modulation plane and the first lens is substantially equal to a focal length of the first lens. The spatial light modulator displays a Fresnel type kinoform on the phase modulation plane.

13 Claims, 12 Drawing Sheets

(51) Int. Cl.
  *G02B 21/00* (2006.01)
  *G02B 21/14* (2006.01)
  *G03H 1/00* (2006.01)
  *B23K 26/06* (2014.01)
  *B23K 26/067* (2006.01)
  *B23K 26/082* (2014.01)
  *B23K 26/0622* (2014.01)
  *G02B 26/06* (2006.01)
  *G02B 27/18* (2006.01)
  *B23K 101/40* (2006.01)
  *B23K 103/00* (2006.01)
  *G03H 1/22* (2006.01)
  *G03H 1/08* (2006.01)

(52) U.S. Cl.
  CPC ........ *B23K 26/0652* (2013.01); *B23K 26/082* (2015.10); *G02B 13/22* (2013.01); *G02B 21/0032* (2013.01); *G02B 21/0056* (2013.01); *G02B 21/14* (2013.01); *G02B 26/06* (2013.01); *G02B 27/18* (2013.01); *G03H 1/0005* (2013.01); *B23K 2101/40* (2018.08); *B23K 2103/50* (2018.08); *G02F 2203/12* (2013.01); *G02F 2203/18* (2013.01); *G02F 2203/50* (2013.01); *G03H 1/2294* (2013.01); *G03H 2001/085* (2013.01); *G03H 2001/2255* (2013.01)

(58) Field of Classification Search
  USPC .............. 359/10, 11, 35, 237, 238, 245, 457
  See application file for complete search history.

(56) References Cited

U.S. PATENT DOCUMENTS

| | | |
|---|---|---|
| 2005/0041229 A1 | 2/2005 | Meisburger |
| 2009/0310206 A1* | 12/2009 | Gluckstad .............. G02B 27/52 359/238 |
| 2010/0079832 A1 | 4/2010 | Takiguchi et al. |

FOREIGN PATENT DOCUMENTS

| | | |
|---|---|---|
| GB | 2448132 A | 10/2008 |
| JP | H11-326860 A | 11/1999 |
| JP | 2005-536875 A | 12/2005 |
| JP | 2006-072279 A | 3/2006 |
| JP | 2009-541785 A | 11/2009 |
| JP | 2010-082672 A | 4/2010 |
| JP | 2011-051011 A | 3/2011 |
| JP | 2014-095863 A | 5/2014 |
| WO | WO-2008/120015 A1 | 10/2008 |

* cited by examiner

Fig.3
(a) 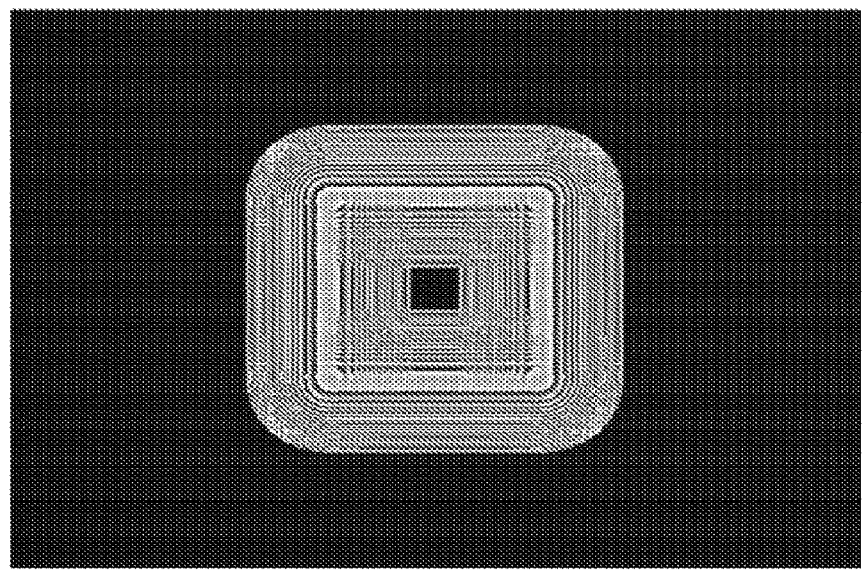
(b) 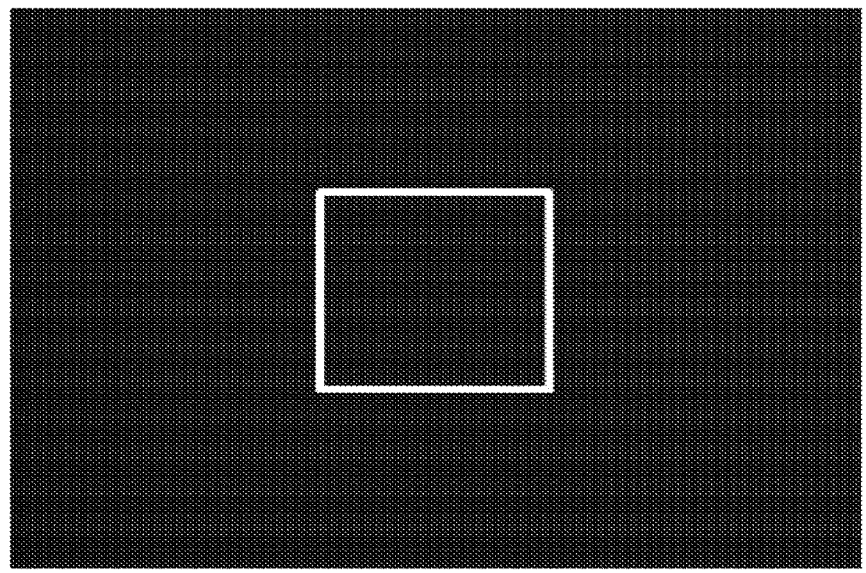

Fig.4
(a) 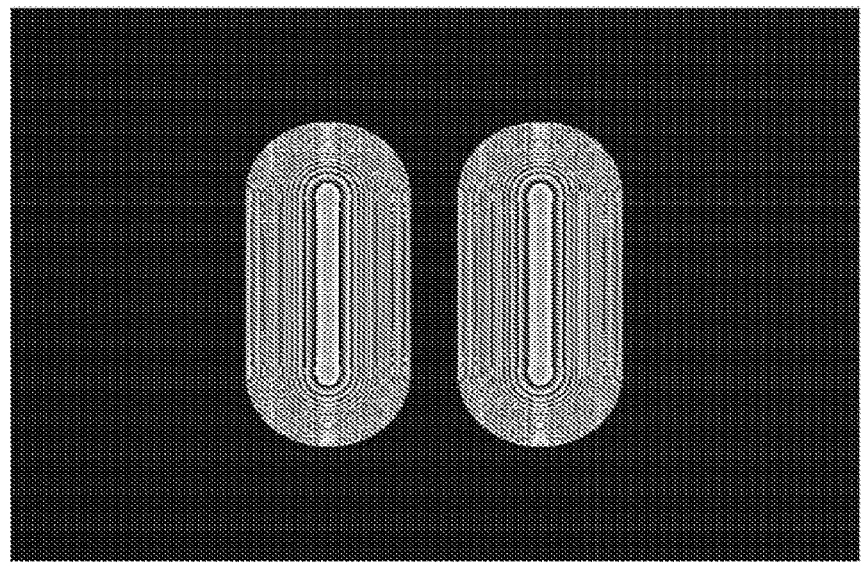
(b) 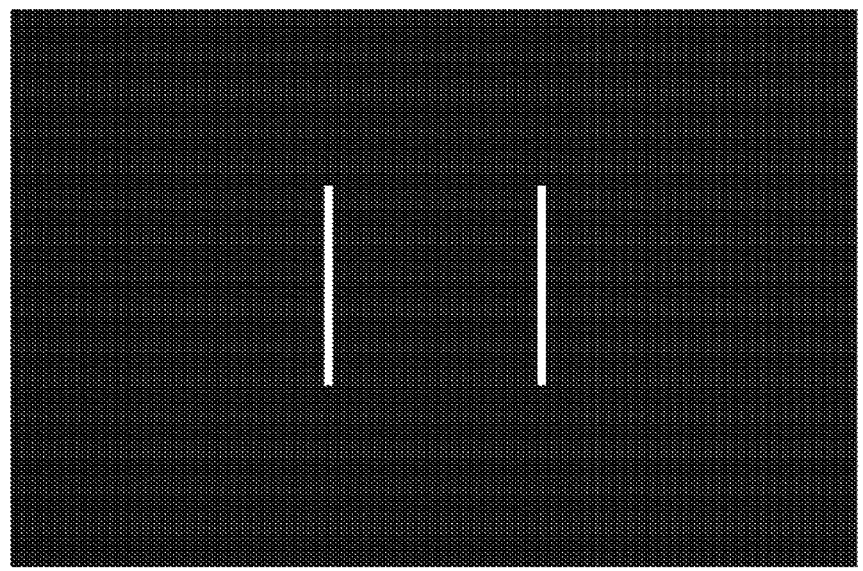

Fig. 5
(a) 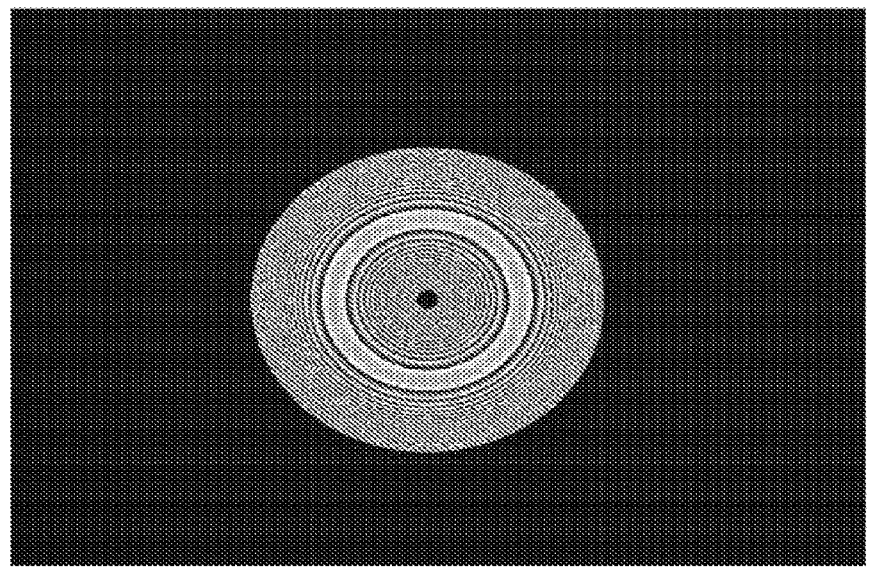
(b) 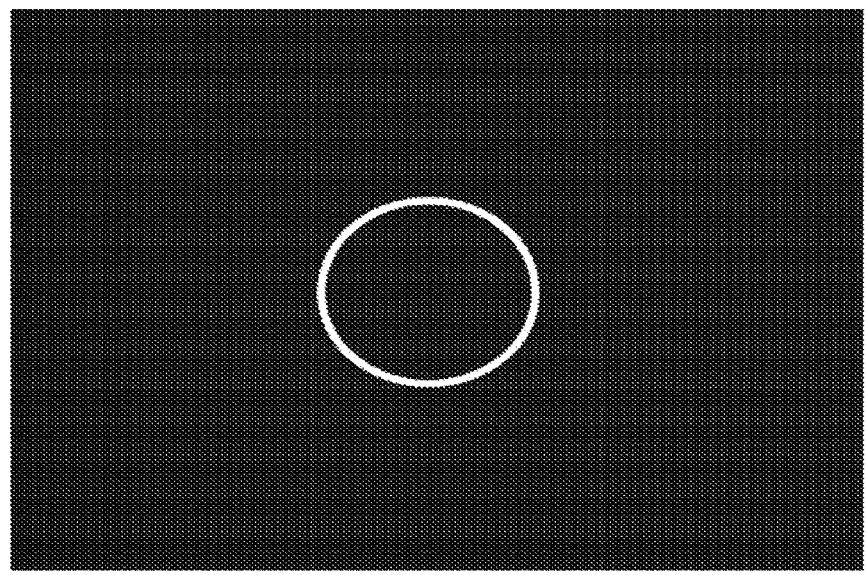

LIGHT IRRADIATION DEVICE

CROSS-REFERENCE TO RELATED APPLICATIONS

This application is a continuation application of U.S. patent application Ser. No. 14/441,981, filed May 11, 2015, which is a § 371 of International Application No. PCT/JP2013/078986, filed Oct. 25, 2013, which claims the benefit of Japanese Patent Application No. 2012-248443, filed Nov. 12, 2012. The entire contents of each of these applications are incorporated herein by reference.

TECHNICAL FIELD

The present invention relates to a light irradiation apparatus.

BACKGROUND ART

Non-Patent Document 1 describes a femtosecond laser processing method using holography including a multiplexed Fresnel lens, for high-speed parallel processing of microstructures. FIG. 12 is a view showing a partial configuration of a device described in this document. As shown in FIG. 12, this device includes a spatial light modulator 102 that modulates readout light in phase, and a telecentric optical system 104 that condenses modulated light La modulated in phase. The telecentric optical system 104 has two lenses 106 and 108, and the modulated light La output from the spatial light modulator 102 is once focused between the spatial light modulator 102 and the first-stage lens 106 to form a light condensing point P1.

CITATION LIST

Non Patent Literature

Non-Patent Document 1: Satoshi Hasegawa, Yoshio Hayasaki, and Nobuo Nishida, "Holographic femtosecond laser processing with multiplexed phase Fresnel lenses," Optics Letters, Vol. 31, No. 11, Jun. 1, 2006

SUMMARY OF INVENTION

Technical Problem

In the device described in Non-Patent Document 1, the spatial light modulator 102 is caused to display a multiplexed Fresnel lens pattern such that modulated light La having a desired intensity distribution is obtained at the light condensing point P1. Then, the intensity distribution of the modulated light La at the light condensing point P1 is transferred to a target plane F1 via the telecentric optical system 104. However, such a method has the following problem. That is, because the modulated light La is once focused at the light condensing point P1, the variable range in the optical axis direction of a light condensing point P2 of the modulated light La output from the lens 108 is the extent of the depth of focus of the lens 108, which is considerably small. Thus, for making the irradiation position of the modulated light La in the optical axis direction variable, it is necessary to move the telecentric optical system 104 and an irradiation object in the optical axis direction, so that the device is complicated in structure.

The present invention has been made in view of the above problem, and an object thereof is to provide a light irradiation apparatus capable of easily changing the irradiation position of modulated light in the optical axis direction.

Solution to Problem

In order to solve the above-described problem, a light irradiation apparatus according to the present invention is a light irradiation apparatus for irradiating an irradiation object with light, and includes a light source for outputting readout light, a spatial light modulator including a phase modulation plane including a plurality of two-dimensionally arrayed regions, and for modulating the readout light in phase in each of the plurality of regions to output modulated light, and a both-sided telecentric optical system including a first lens optically coupled to the phase modulation plane of the spatial light modulator and a second lens optically coupled between the first lens and the irradiation object, and optically coupling the phase modulation plane and the irradiation object, in which an optical distance between the phase modulation plane and the first lens is substantially equal to a focal length of the first lens, and the spatial light modulator displays a Fresnel type kinoform on the phase modulation plane.

Advantageous Effects of Invention

The light irradiation apparatus according to the present invention enables easily changing the irradiation position of modulated light in the optical axis direction.

BRIEF DESCRIPTION OF DRAWINGS

FIG. 3 includes (a) an image showing an example of a Fresnel type kinoform calculated by a calculation method of an embodiment, and (b) a view showing a shape of modulated light with which an irradiation object is irradiated according to the kinoform.

FIG. 4 includes (a) an image showing an example of a Fresnel type kinoform calculated by a calculation method of an embodiment, and (b) a view showing a shape of modulated light with which an irradiation object is irradiated according to the kinoform.

FIG. 5 includes (a) an image showing an example of a Fresnel type kinoform calculated by a calculation method of an embodiment, and (b) a view showing a shape of modulated light with which an irradiation object is irradiated according to the kinoform.

DESCRIPTION OF EMBODIMENTS

Hereinafter, embodiments of a light irradiation apparatus according to the present invention will be described in detail with reference to the accompanying drawings. In addition, in the description of the drawings, the same elements are denoted by the same reference symbols, and overlapping description will be omitted.

Figure 1:
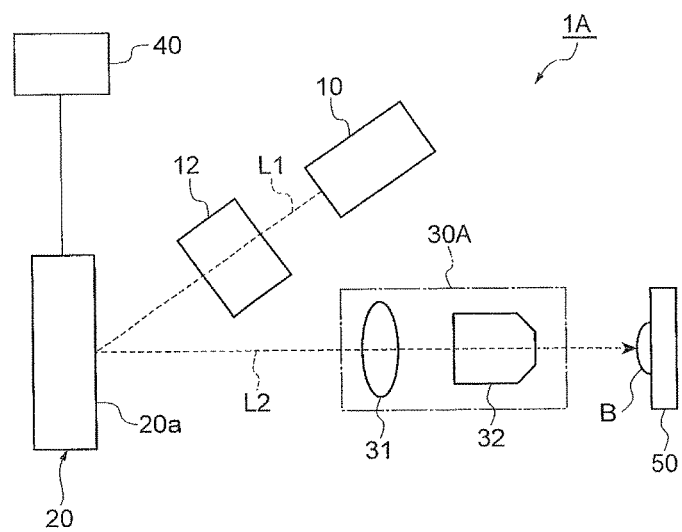
FIG. 1 is a view showing a configuration of a light irradiation apparatus according to an embodiment.

FIG. 1 is a view showing a configuration of a light irradiation device 1A according to an embodiment of the present invention. The light irradiation device 1A of the present embodiment is an illumination device for illuminating an observation object B (hereinafter, referred to as an irradiation object) in an optical microscope. As shown in FIG. 1, the light irradiation device 1A of the present embodiment includes a readout light source 10, a front optical system 12, a spatial light modulator (Spatial Light Modulator; SLM) 20, a both-sided telecentric optical system 30A (hereinafter, simply referred to as an optical system 30A), a control section 40, and a stage 50 that supports the irradiation object B.

The readout light source 10 outputs readout light L1 having a predetermined wavelength. The readout light L1, preferably, is monochromatic and has some degree of coherence, and is, for example, laser light. Further, the readout light L1 may be low-coherence light such as light from an LED, but when a plurality of wavelength components are included in the readout light L1, correction by a color correction lens or the like is required in some cases.

The front optical system 12 is optically coupled to the readout light source 10, and guides the readout light L1 output from the readout light source 10 to the spatial light modulator 20. The front optical system 12 may include an optical system such as, for example, a beam expander or a spatial filter. Further, the front optical system 12 may include various optical components such as, for example, a beam splitter, a wave plate, a polarizer, and a lens.

The spatial light modulator 20 has a phase modulation plane 20a including a plurality of two-dimensionally arrayed regions, and generates modulated light L2 by modulating the readout light L1 in phase in each of the plurality of regions. On the phase modulation plane 20a, a Fresnel type kinoform is displayed according to a control signal provided from the control section 40. In addition, the kinoform means spatial phase information. The spatial light modulator 20 provides modulated light L2 to the optical system 30A. In addition, the method for calculating a Fresnel type kinoform will be described later.

The optical system 30A has a front lens 31 (first lens) and a rear lens 32 (second lens). The front lens 31 is a convex lens, and is optically coupled to the phase modulation plane 20a of the spatial light modulator 20. Further, the rear lens 32 is a so-called objective lens and disposed between the front lens 31 and the irradiation object B, one surface is optically coupled to the front lens 31, and the other surface is optically coupled to the irradiation object B. In addition, the rear lens 32 may be a convex lens. As a result of having such a configuration, the optical system 30A optically couples the phase modulation plane 20a and the irradiation object B.

Figure 2:
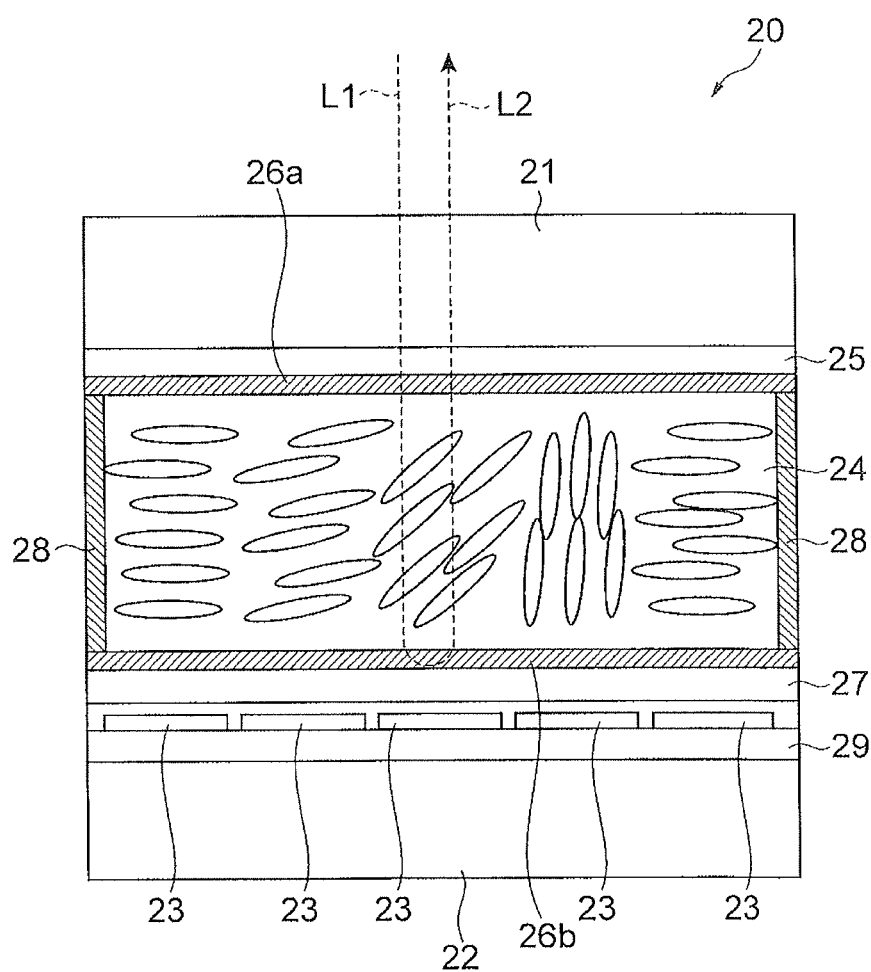
FIG. 2 is a sectional view schematically showing an LCOS type spatial light modulator as an example of a spatial light modulator.

FIG. 2 is a sectional view schematically showing an LCOS type spatial light modulator as an example of the spatial light modulator 20 of the present embodiment, and shows a section taken along an optical axis of the readout light L1. The spatial light modulator 20 includes a transparent substrate 21, a silicon substrate 22, a plurality of pixel electrodes 23, a liquid crystal layer 24, a transparent electrode 25, alignment films 26a and 26b, a dielectric mirror 27, and a spacer 28.

The transparent substrate 21 is made of a material that transmits readout light L1, and disposed along a principal surface of the silicon substrate 22. The plurality of pixel electrodes 23 are arrayed in a two-dimensional grid pattern on the principal surface of the silicon substrate 22, and constitute respective pixels of the spatial light modulator 20. The transparent electrode 25 is disposed on a surface of the transparent substrate 21 that is opposed to the plurality of pixel electrodes 23. The liquid crystal layer 24 is disposed between the plurality of pixel electrodes 23 and the transparent electrode 25. The alignment film 26a is disposed between the liquid crystal layer 24 and the transparent electrode 25, and the alignment film 26b is disposed between the liquid crystal layer 24 and the plurality of pixel electrodes 23. The dielectric mirror 27 is disposed between the alignment film 26b and the plurality of pixel electrodes 23. The dielectric mirror 27 reflects the readout light L1 having entered from the transparent substrate 21 and transmitted through the liquid crystal layer 24 so as to output again from the transparent substrate 21.

Further, the spatial light modulator 20 further includes a pixel electrode circuit (active matrix driving circuit) 29 that controls voltages to be applied between the plurality of pixel electrodes 23 and the transparent electrode 25. When voltage is applied to any pixel electrode 23 from the pixel electrode circuit 29, the refractive index of the liquid crystal layer 24 on the pixel electrode 23 changes according to the level of an electric field generated between the pixel electrode 23 and the transparent electrode 25. Thus, the optical path length of the readout light L1 that is transmitted through the relevant portion of the liquid crystal layer 24 changes, and accordingly, the phase of the readout light L1 changes. Moreover, by applying various levels of voltage to the plurality of pixel electrodes 23, a spatial distribution of the phase modulation amount can be electrically written, and various kinoforms can be displayed according to necessity.

In addition, the spatial light modulator 20 is not limited to an electrically addressable liquid crystal element as shown in FIG. 2, and may be, for example, an optically addressable liquid crystal element or a deformable mirror type light modulator. Further, a reflection type spatial light modulator 20 is shown in FIG. 2, but the spatial light modulator 20 of the present embodiment may be a transmission type.

Hereinafter, as an example of a method for calculating a Fresnel type kinoform to be displayed on the spatial light modulator 20, a calculation method by reverse propagation will be described.

In the present embodiment, a reconstruction image plane of the modulated light L2 modulated by the spatial light modulator 20 is set so as to overlap the irradiation object B. If it is assumed that a pattern (target pattern) of the modulated light L2 on the reconstruction image plane is composed of M (here, M is an integer of 2 or more) point light sources, a hologram plane in the phase modulation plane 20a can be handled as a sum of wavefront propagation functions from the respective point light sources.

Moreover, where the coordinates of each point light source in the reconstruction image plane are provided as $(x_m, y_m)$ (here, $m = 0, 1, \ldots, M-1$), a wavefront propagation function $u_m(x_a, y_b)$ of each point light source at the coordinates $(x_a, y_b)$ (here, $a, b = 0, 1, \ldots, N-1$, N is the number of pixels in the x-direction or y-direction) of each pixel of the hologram plane is expressed as in the following formula (1).

[Formula 1]

$$u_m(x_a, y_b) = \frac{1}{r_m}\exp\left[-i\left\{k\sqrt{(x_a-x_m)^2+(y_b-y_m)^2+z^2}+\delta(x_a,y_b)\right\}\right] = A_m \cdot \exp(-i\theta_m) \quad (1)$$

Here, i is an imaginary unit, k is a wavenumber (=$2\pi/\lambda$, $\lambda$ is the wavelength of the modulated light L2), z is a distance between the reconstruction image plane and the hologram plane, $A_m$ is a complex amplitude component (i.e., the intensity of light), $\theta_m$ is a phase component, and $\delta$ is an initial phase in each pixel.

Further, $r_m$ is a numerical value defined by the following formula (2),

[Formula 2]

$$r_m = \sqrt{(x_a-x_m)^2+(y_b-y_m)^2+z^2} \quad (2)$$

and represents a distance from each point light source within the reconstruction image plane to each pixel of the hologram plane.

In the present method, a sum total $u_{total}(x_a, y_b)$ of the wavefront propagation functions $u_m$ regarding the M point light sources is determined by the following formula (3).

[Formula 3]

$$u_{total}(x_a, y_b) = \sum_{m}^{M-1} A_m \cdot \exp(-i\theta_m) \quad (3)$$

Then, by extracting a phase component from the sum total $u_{total}(x_a, y_b)$, a kinoform by a computer generated hologram (Computer Generated Hologram; CGH) is prepared.

In addition, extracting a phase component here is for disregarding amplitude information included in the wavefront propagation function $u_m$ because the spatial light modulator 20 is a phase modulation type spatial light modulator. Further, at this time of calculation, it is necessary to limit the function region of the wavefront propagation function $u_m$ such that a return line of phase wrapping does not exceed a Nyquist frequency, i.e., such that in a phase term $\exp(-i\theta_m)$ of the wavefront propagation function $u_m$, a phase difference from a neighboring pixel does not exceed $\pi$(rad).

FIG. 3 to FIG. 5 include (a) images showing Fresnel type kinoforms calculated by the calculation method described above, and (b) views showing shapes (sectional shapes perpendicular to the optical axis) of modulated light L2 with which the irradiation object B is irradiated according to those kinoforms. FIG. 3 shows a case where the shape of modulated light on the irradiation object B is a rectangular shape. FIG. 4 shows a case where the shape of modulated light on the irradiation object B is a circular shape. FIG. 5 shows a case where the shape of modulated light on the irradiation object B is a linear shape of two straight lines that are parallel to each other.

According to the calculation method described above, it is possible to provide the Fresnel type kinoform to be displayed on the phase modulation plane 20a as a kinoform that, like those, makes the shape of modulated light L2 on the irradiation object B a circular shape, a rectangular shape, or a linear shape. In addition, the shape of modulated light L2 on the irradiation object B is not limited to these, and can be various shapes.

Figure 6:
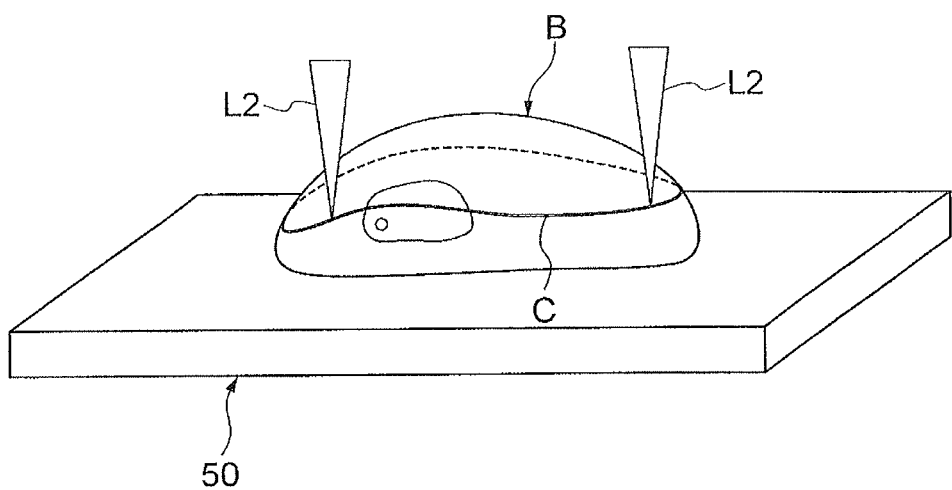
FIG. 6 is a view conceptually showing a state of three-dimensionally irradiating modulated light onto an irradiation object.

Further, by use of the calculation method described above, a kinoform that allows three-dimensionally irradiating modulated light L2 onto an irradiation object B can also be calculated. FIG. 6 is a view conceptually showing a state of three-dimensionally irradiating modulated light L2 onto an irradiation object B (for example, a cell). The solid line C shown in the figure indicates a portion for which modulated light L2 is irradiated on the surface of the irradiation object B.

In addition, in the calculation method described above, making the optical intensity in a central portion of an optical intensity distribution on the reconstruction image plane smaller than the optical intensity in a surrounding portion of the optical intensity distribution allows maintaining a sufficient numerical aperture (NA) while adjusting the irradiation light amount. Further, the optical intensity $A_m$ may be adjusted in distribution by an iteration method that performs computational or experimental feedback.

Further, in the calculation method described above, the numerical aperture (NA) may be changed to an extent such as not to exceed a Nyquist frequency. The optical intensity of the modulated light L2 with which the irradiation object B is irradiated and the size of a light condensing point can thereby be arbitrarily changed.

Further, the formulas in the calculation method described above may include an initial value, but an initial phase $\theta_m{}'$ calculated by the following formula (4) may be added after a kinoform calculation.

[Formula 4]

$$\theta'_m = \theta_m + \delta_{initial} \quad (4)$$

In addition, the initial phase $\theta_m{}'$ may be for adjustment of aberration correction, beam shaping, beam spread, etc.

Further, in the calculation method described above, the wavelength (design wavelength) of the modulated light L2 suffices with a wavelength included in a range that allows modulation by the spatial light modulator 20, and is not at all limited by other requirements.

Further, the value of an intensity of the readout light L1 used in the calculation method described above may be either of a theoretical value and an experimental value. Here, it is desirable that the intensity distribution in a section perpendicular to the optical axis of the readout light L1 is nearly uniform. Where the intensity distribution of the readout light L1 is not uniform, it is necessary to design a kinoform by calculation including intensity distribution information of the readout light L1. The intensity distribution of the readout light L1 at this time is desirably an intensity distribution obtained on a plane that is conjugate to the phase modulation plane 20a.

In addition, a kinoform to be displayed on the phase modulation plane 20a can also be calculated by various methods, in addition to the above-described calculation method by reverse propagation. For example, a kinoform may be calculated by use of a calculation method for which Fresnel diffraction is applied to a common iteration method (for example, the GS method) or the like.

Figure 7:
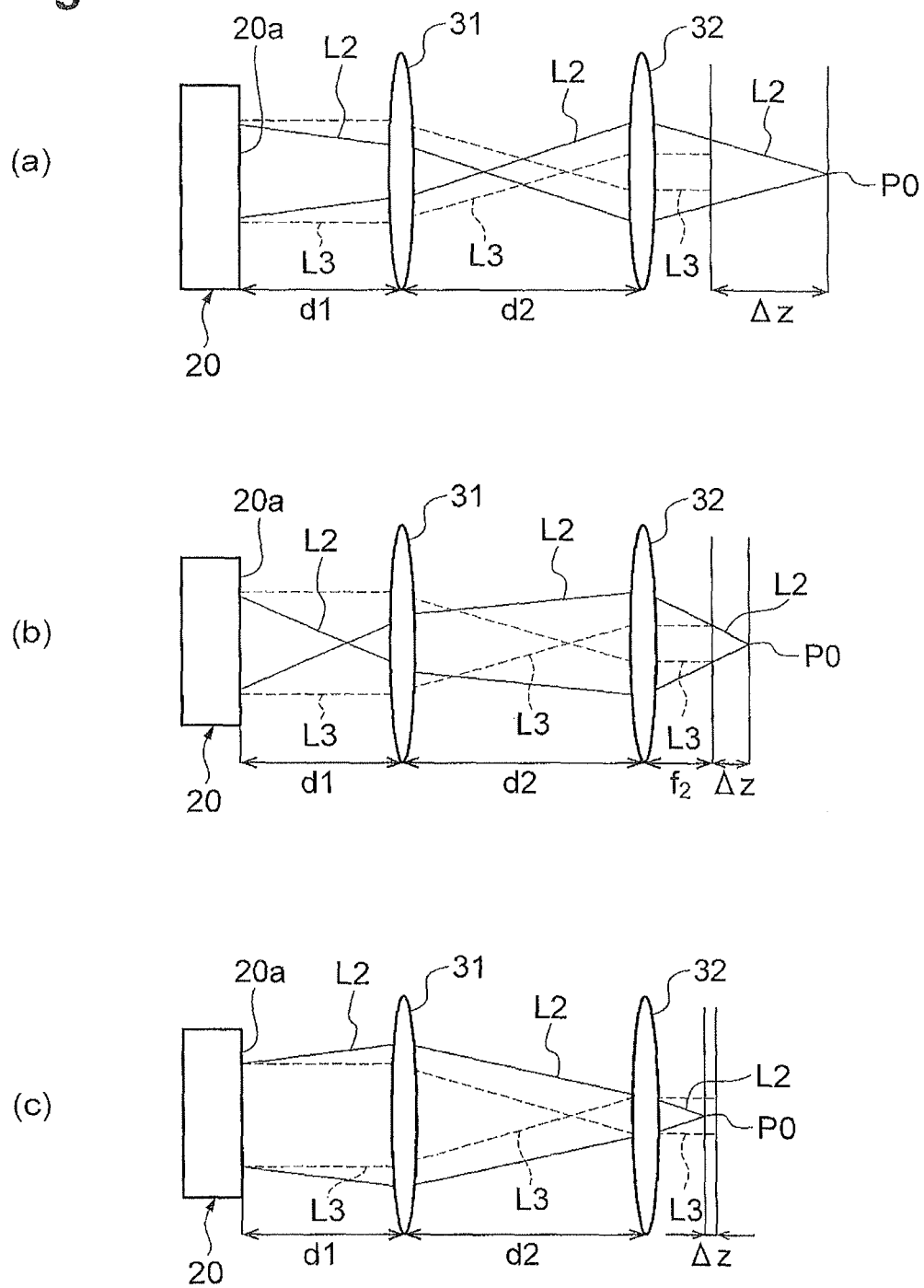
FIG. 7 includes views showing states of modulated light output from a phase modulation plane being condensed by an optical system.
Figure 12:
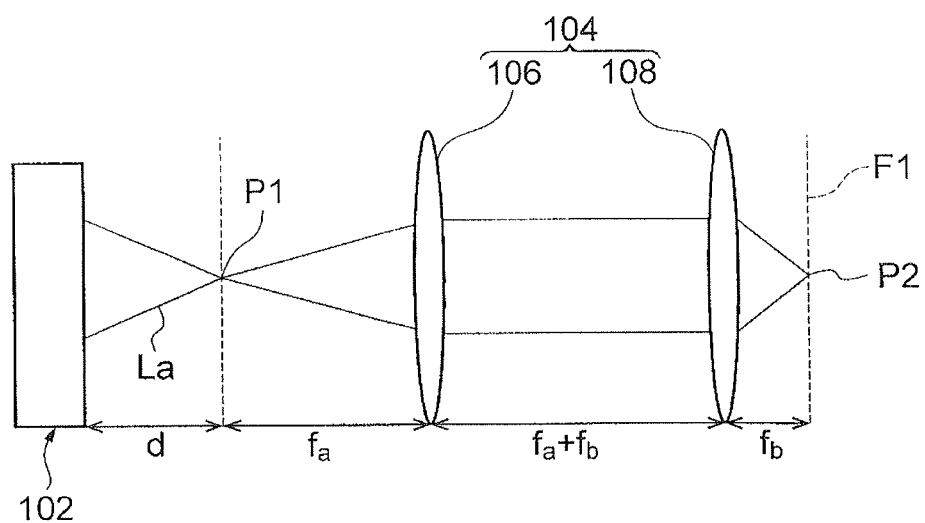
FIG. 12 is a view showing a partial configuration of the device described in Non-Patent Document 1.

Subsequently, the Fresnel type kinoform to be displayed on the phase modulation plane 20a and the configuration of the optical system 30A will be described in detail. (a) in FIG. 7 to (c) in FIG. 7 are views showing states of modulated light L2 output from the phase modulation plane 20a being focused by the optical system 30A. In the present embodiment, an optical distance d1 between the phase modulation plane 20a and the front lens 31 is substantially equal to the focal length of the front lens 31. The optical system 30A of the present embodiment is different in such a point from the configuration shown in FIG. 12. In the configuration of FIG. 12, the distance between the phase modulation plane of the spatial light modulator 102 and the lens 106 equals a sum of a focal length d of a Fresnel lens that is displayed on the phase modulation plane and a focal length fa of the lens 106.

In the present embodiment, the Fresnel type kinoform that is displayed on the phase modulation plane 20a can include a kinoform that reduces (condenses) the modulated light L2 in diameter toward the front lens 31. (a) in FIG. 7 and (b) in FIG. 7 each show modulated light L2 that is reduced in diameter toward the front lens 31. In the configuration shown in (a) in FIG. 7, the focal length by a Fresnel type kinoform is longer than the optical distance d1 between the phase modulation plane 20a and the front lens 31. Further, in the configuration shown in (b) in FIG. 7, the focal length by a Fresnel type kinoform is shorter than the optical distance d1 between the phase modulation plane 20a and the front lens 31.

Further, in the present embodiment, the Fresnel type kinoform that is displayed on the phase modulation plane 20a can include a kinoform that expands laser light in diameter toward the front lens 31. (c) in FIG. 7 shows modulated light L2 that is expanded in diameter toward the front lens 31. In addition, for the purpose of comparison, the outline of modulated light L3 output as parallel light from the phase modulation plane 20a is shown by dashed lines in (a) in FIG. 7 to (c) in FIG. 7.

As shown in (a) in FIG. 7 to (c) in FIG. 7, depending on the configuration of the modulated light L2 output from the phase modulation plane 20a, the position of a light condensing point PO in the optical axis direction changes. That is, a distance Δz between the light condensing point PO and a focal plane F of the rear lens 32 is determined by the Fresnel type kinoform that is displayed on the phase modulation plane 20a.

When illuminating the irradiation object B, it is indeed possible that the optical system 30A described above is omitted when the light condensing point is large and the irradiation region is wide, however, in light irradiation in a microscope, it is necessary to have a small light condensing point and efficiently condense light into a narrow region. However, with only the phase modulation type spatial light modulator 20, its phase resolution and spatial resolution are not sufficient in some cases, it is difficult in such a case to generate a sufficiently small light condensing point. Thus, it is desirable to construct the optical system 30A using a lens having a high numerical aperture (NA).

Moreover, in such a case, it is desirable to use a Kepler type afocal optical system (4f optical system) and to provide a rear lens of this optical system as an objective lens. The optical system 30A of the present embodiment constitutes a Kepler type afocal system, and an optical distance d2 between the front lens 31 and the rear lens 32 is substantially equal to a sum $(f_1+f_2)$ of a focal length $f_1$ of the front lens 31 and a focal length $f_2$ of the rear lens 32. Further, because the optical system 30A described above is an optical system that is telecentric on both sides, a focal plane of the objective lens (rear lens 32) is in a conjugate relationship with the phase modulation plane 20a of the spatial light modulator 20. In addition, a zeroth-order light component of a Fourier optical system remains as background noise, but in the optical system 30A of the present embodiment, such noise is negligibly small as compared with a light condensing point.

Here, the reduction ratio M of the 4f optical system is determined by the following formula (5).
[Formula 5]

$$M=f_2/f_1 \qquad (5)$$

Because the distance L from the spatial light modulator 20 to the conjugate plane is as follows,
[Formula 6]

$$L=2(f_1+f_2) \qquad (6)$$

an optimal combination of the front lens 31 and the rear lens 32 can be determined based on these formulas (5) and (6), and the optical system can be optimized.

On the other hand, the position of a light condensing point in the optical axis direction is unambiguously determined by a kinoform design value and the reduction ratio M. That is, where the design focal length of the kinoform is provided as z, the light condensing point is located at a distance of Δz (=z×M) from the focal plane of the rear lens 32 (refer to (a) in FIG. 7 to (c) in FIG. 7). This relationship holds similarly even when z is negative.

In addition, the relationship described above holds even if the interval between the rear lens 32 and the phase modulation plane 20a changes, but when the interval greatly changes, it is preferable to determine Δz including a calculation of a combined focal length. This is the same even when the optical system 30A constitutes a Kepler type afocal system. Such Δz is determined, for example, as in the following.

Where the focal length of a Fresnel type kinoform that is displayed on the phase modulation plane 20a is provided as $f_{SLM}$, the focal length of the front lens 31 is provided as $f_1$, the focal length of the rear lens 32 is provided as $f_2$, the distance between the phase modulation plane 20a and the front lens 31 is provided as $f_1$, and the distance between the front lens 31 and the rear lens 32 is provided as $f_1+f_2$, a combined focal length f' of the Fresnel type kinoform and the front lens 31 is calculated by the following formula (7).

[Formula 7]

$$\frac{1}{f'} = \frac{1}{f_{SLM}} + \frac{1}{f_1} - \frac{f_1}{f_{SLM} f_1} \qquad (7)$$

Similar to the above, the combined focal length f of the combined focal length f' and the rear lens 32 is calculated by the following formula (8).

[Formula 8]

$$\frac{1}{f} = \frac{1}{f'} + \frac{1}{f_2} - \frac{f_1+f_2}{f'f_2} \qquad (8)$$

Moreover, Δz is calculated by the following formula (9).
[Formula 9]

$$\Delta z = f - f_2 \qquad (9)$$

In addition, in the optical system 30A of the present embodiment, each of the front lens 31 and the rear lens 32 may consist of a single lens, or each lens may consist of a plurality of lenses. Further, the optical system 30A may include another lens in addition to the front lens 31 and the rear lens 32. In that case, it is preferable to include the focal length of the other lens in a calculation of the combined focal length f described above. Further, the optical system 30A may include, in addition to the front lens 31 and the rear lens 32, optical components (for example, a beam splitter, a wave plate, a polarizer, a scanner, etc.) other than lenses to such an extent that large wavefront aberration does not occur.

Effects to be obtained by the light irradiation device 1A according to the present embodiment described above will be described.

As previously described, in the device described in Non-Patent Document 1, as shown in FIG. 12, because the modulated light La is once focused at the light condensing point P1, the variable range in the optical axis direction of a light condensing point P2 of the modulated light La that is output from the lens 108 is the extent of the depth of focus of the lens 108, which is considerably small. Thus, for making the irradiation position of the modulated light La in the optical axis direction variable, it is necessary to move the telecentric optical system 104 and an irradiation object in the optical axis direction, so that the device is complicated in structure. That is, the telecentric optical system 104 needs to be moved by a stage or the like such that, where the focal length of a Fresnel lens that is displayed on the spatial light modulator 102 is provided as d, and the focal length of the lens 106 is provided as fa, the distance between the spatial light modulator 102 and the lens 106 becomes d+fa. Further, because it is necessary, where the focal length of the lens 108 is provided as fb, to arrange an object at a position separated by the distance fb from the lens 108, the object also needs to be moved in position simultaneously with the telecentric optical system 104.

To cope with such problems, in the light irradiation device 1A of the present embodiment, by only changing a kinoform to be displayed on the phase modulation plane 20a, the irradiation position of the modulated light L2 in the optical axis direction (i.e., the position of a light condensing point, $\Delta z$) can be changed without moving the optical system 30A. Thus, according to this light irradiation device 1A, a change in irradiation position of the modulated light L2 in the optical axis direction can be easily performed by a simple configuration, which enables downsizing of the device. Further, because a Fresnel type kinoform is used as a kinoform to be displayed on the phase modulation plane 20a, the variable range of the irradiation position of the modulated light L2 can be sufficiently increased. Further, even when the optical intensity distribution or wavelength of the readout light L1 varies, the irradiation position of the modulated light L2 can be adjusted by only a change in kinoform without moving the optical system 30A.

Further, when the optical axis of the modulated light L2 with which the irradiation object B is irradiated is changed, this can be changed without moving the optical system 30A by only changing a kinoform to be displayed on the phase modulation plane 20a. Thus, such a change in optical axis can also be easily performed. Further, the numerical aperture (NA) can also be easily changed without replacing the optical system 30A. Further, an adjustment of the light amount of the modulated light L2 with which the irradiation object B is irradiated is also easy.

Further, according to this light irradiation device 1A, even when the objective lens (rear lens 32) is replaced in order to change the microscope in magnification ratio, the shape of the modulated light L2 can be maintained by only a change in kinoform, which can make a change in optical system unnecessary.

Further, according to this light irradiation device 1A, illumination light having high intensity uniformity and a continuous sectional shape such as a straight line, which is difficult to be realized with a Fourier type kinoform, can be easily realized. Further, according to this light irradiation device 1A, a region of the irradiation object B to be simultaneously illuminated is not limited to a planar region, and a three-dimensional region can also be simultaneously illuminated.

Further, according to this light irradiation device 1A, because a Fresnel type kinoform is used as a kinoform to be displayed on the phase modulation plane 20a, the effect of a zeroth-order light component can be reduced as previously described. Thus, when, for example, this light irradiation device 1 A is applied to a fluorescence microscope, photobleaching can be suppressed to be small.

Further, in this light irradiation device 1A, an optical intensity distribution of the modulated light L2 may be experimentally measured, and the measurement result may be fed back to the design of kinoforms. Illumination that conforms to the demand of the user side and in a highly versatile configuration is thereby enabled. In addition, when measuring an optical intensity distribution of the modulated light L2, it is preferable to provide a measuring device at a position where the image plane same as a light condensing plane of the modulated light L2 can be observed.

Further, in this light irradiation device 1A, optical compensation may be performed for the modulated light L2 by further providing a reference light source and a wavefront sensor separately from the readout light source 10. At this time, it is preferable that a wavefront for compensation calculated from a detection result of the wavefront sensor is provided as an initial value at the time of above-described kinoform calculation.

In addition, this light irradiation device 1A can also be applied to SIM (Structured Illumination Microscopy), which is recently being actively researched.

(First Modification)

Figure 8:
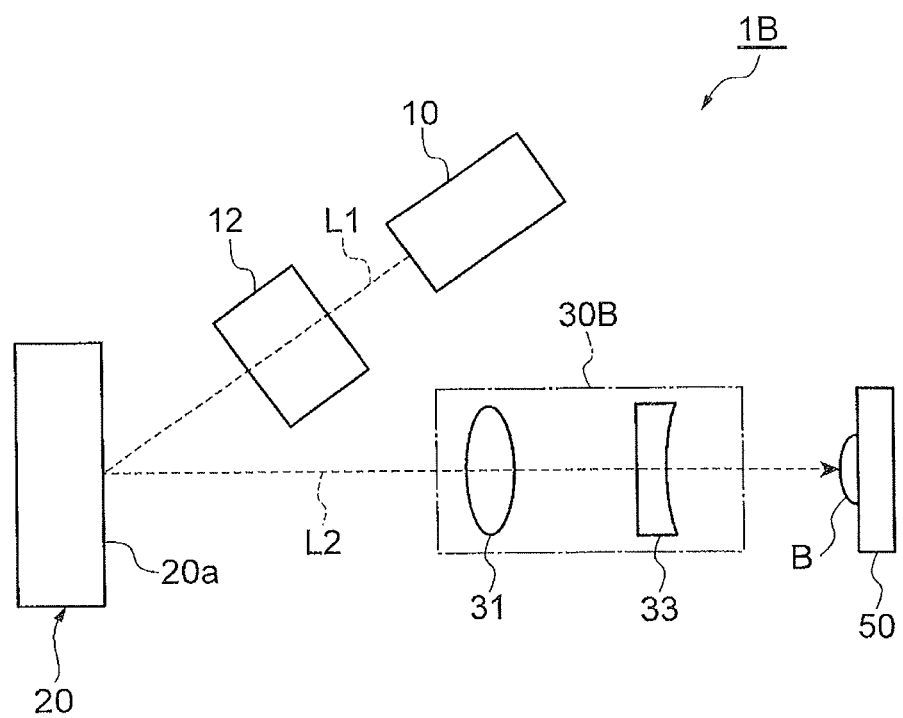
FIG. 8 is a view showing a configuration of a light irradiation apparatus serving as a first modification.

FIG. 8 is a view showing a configuration of a light irradiation device 1B as a first modification of the above-described embodiment. The light irradiation device 1B includes an optical system 30B in place of the optical system 30A of the above-described embodiment. In addition, configurations other than the optical system 30B are the same as those of the above-described embodiment.

The optical system 30B of the present modification has a front lens 31 and a rear lens 33. The front lens 31 and the rear lens 33 constitute a so-called Galilean type afocal system, and the rear lens 33 is a concave lens. Even the light irradiation device 1B having such a configuration can provide the same advantageous effects as those of the light irradiation device 1A described above. Here, in the present modification, it is necessary to invert the positive and negative of a phase distribution of a kinoform to be displayed on the phase modulation plane 20a, and also, because the rear lens 33 is provided as a concave lens, an ordinary objective lens cannot be used therefor. In addition, in the present modification, the method for calculating $\Delta z$ is the same as that of the above-described embodiment.

(Second Modification)

Figure 9:
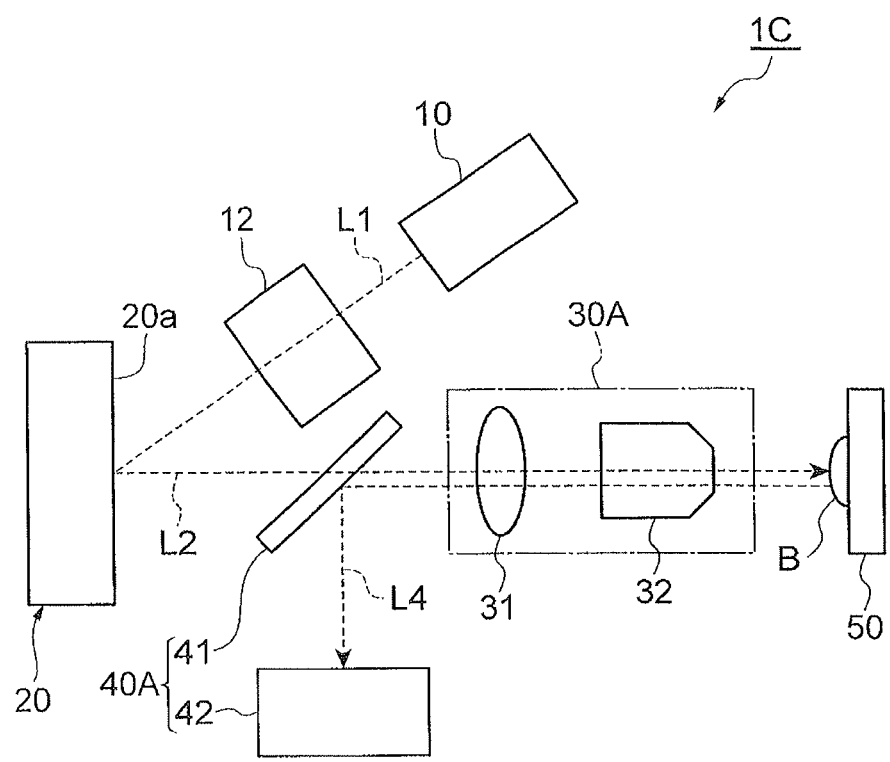
FIG. 9 is a view showing a configuration of a light irradiation apparatus serving as a second modification.

FIG. 9 is a view showing a configuration of a light irradiation device 1C as a second modification of the above-described embodiment. The light irradiation device 1C includes an observation optical system 40A, in addition to the configuration of the light irradiation device 1A of the above-described embodiment. This observation optical system 40A is provided on the same side as the irradiation object B with respect to the stage 50 that supports the irradiation object B.

The observation optical system 40A of the present modification has a beam splitter 41 and an image acquisition sensor 42. The beam splitter 41 is optically coupled between the phase modulation plane 20a and the front lens 31. The beam splitter 41 transmits the modulated light L2 output from the phase modulation plane 20a, toward the front lens 31, and reflects an optical image L4 regarding the irradiation object B obtained via the rear lens 32 and the front lens 31, toward the image acquisition sensor 42. The image acquisition sensor 42 has a photodetecting plane optically coupled to the beam splitter 41, and takes an optical image L4 and generates image data. The optical distance from the front lens 31 to the image acquisition sensor 42 is preferably substantially equal to the focal length of the front lens 31 or close to the focal length. In addition, between the beam splitter 41 and the image acquisition sensor 42, an optical system such as a relay lens or an optical component such as a filter may be provided.

The image acquisition sensor 42 may be any of a one-dimensional sensor, a two-dimensional image sensor, and a spectroscope, or may use these at the same time. If the image acquisition sensor 42 is a one-dimensional sensor, a pinhole may be provided between the front lens 31 and the image acquisition sensor 42 to constitute a confocal system. In addition, the image acquisition sensor 42 preferably has a position adjusting mechanism that makes the position of the photodetecting plane variable. Further, the photodetecting plane of the image acquisition sensor 42 is preferably located on a light condensing plane of the optical image L4.

(Third Modification)

Figure 10:
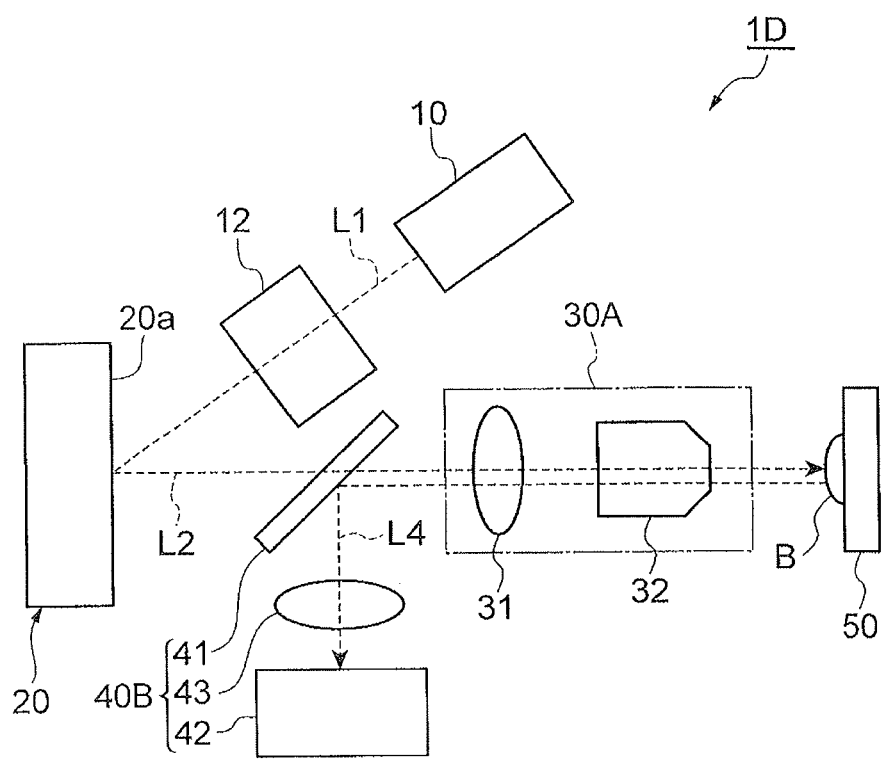
FIG. 10 is a view showing a configuration of a light irradiation apparatus serving as a third modification.

FIG. 10 is a view showing a configuration of a light irradiation device 1D as a third modification of the above-described embodiment. The light irradiation device 1D includes an observation optical system 40B, in addition to the configuration of the light irradiation device 1A of the above-described embodiment. This observation optical system 40B is provided on the same side as the irradiation object B with respect to the stage 50 that supports the irradiation object B.

The observation optical system 40B of the present modification includes an imaging lens 43, in addition to the configuration of the observation optical system 40A (the beam splitter 41 and the image acquisition sensor 42) of the second modification. The imaging lens 43 is optically coupled between the beam splitter 41 and the photodetecting plane of the image acquisition sensor 42. The optical distance from the imaging lens 43 to the image acquisition sensor 42 is preferably substantially equal to the focal length of the imaging lens 43 or close to the focal length. In addition, between the beam splitter 41 and the image acquisition sensor 42, an optical system such as a relay lens or an optical component such as a filter may be further provided. Further, the photodetecting plane of the image acquisition sensor 42 is preferably located on a light condensing plane of an optical image L4.

(Fourth Modification)

Figure 11:
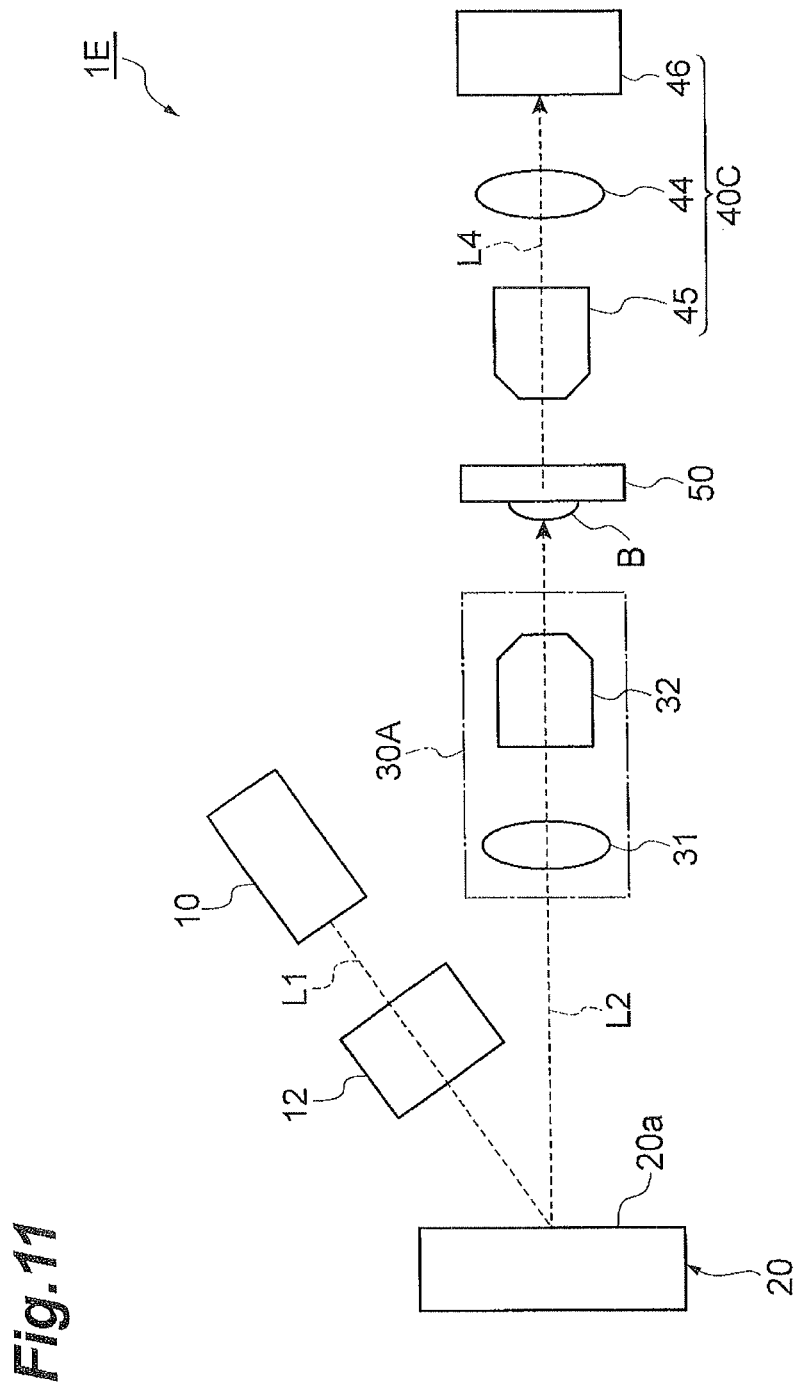
FIG. 11 is a view showing a configuration of a light irradiation apparatus serving as a fourth modification.

FIG. 11 is a view showing a configuration of a light irradiation device 1E as a fourth modification of the above-described embodiment. The light irradiation device 1E includes an observation optical system 40C, in addition to the configuration of the light irradiation device 1A of the above-described embodiment. This observation optical system 40C is provided on an opposite side to the irradiation object B with respect to the stage 50 that supports the irradiation object B, and observes an optical image L4 transmitted through the stage 50.

The observation optical system 40C has an imaging lens 44, an objective lens 45, and an image acquisition sensor 46. The imaging lens 44 is optically coupled to a photodetecting plane of the image acquisition sensor 46. Further, the objective lens 45 is disposed between the imaging lens 44 and the irradiation object B, one surface is optically coupled to the imaging lens 44, and the other surface is optically coupled to the irradiation object B. As a result of having such a configuration, the observation optical system 40C takes an optical image L4 regarding the irradiation object B and generates image data.

The optical distance from the imaging lens 44 to the image acquisition sensor 46 is preferably substantially equal to the focal length of the imaging lens 44 or close to the focal length. In addition, between the imaging lens 44 and the image acquisition sensor 46, an optical system such as a relay lens or an optical component such as a filter may be provided.

The image acquisition sensor 46 may be any of a one-dimensional sensor, a two-dimensional image sensor, and a spectroscope, or may use these at the same time. If the image acquisition sensor 46 is a one-dimensional sensor, a pinhole may be provided between the imaging lens 44 and the image acquisition sensor 46 to constitute a confocal system. In addition, the image acquisition sensor 46 preferably has a position adjusting mechanism that makes the position of the photodetecting plane variable. Further, the photodetecting plane of the image acquisition sensor 46 is preferably located on a light condensing plane of the optical image L4.

Although a preferred embodiment of a light irradiation device according to the present invention has been described above, the present invention is not limited to the above-described embodiment, and can also be used as a light illumination device such as a laser processing device. Further, the present invention can be variously modified within the scope of the present invention.

A light irradiation device according to the above-described embodiment, which is a light irradiation apparatus for irradiating an irradiation object with light, includes a light source outputting readout light, a spatial light modulator having a phase modulation plane including a plurality of two-dimensionally arrayed regions, and outputting modulated light by modulating the phase of the readout light in each of the plurality of regions, and a both-sided telecentric optical system having a first lens optically coupled to the phase modulation plane of the spatial light modulator and a second lens optically coupled between the first lens and the irradiation object, and optically coupling the phase modulation plane and the irradiation object, and in which an optical distance between the phase modulation plane and the first lens is substantially equal to a focal length of the first lens, and the spatial light modulator displays a Fresnel type kinoform on the phase modulation plane.

Further, the light irradiation device may be configured such that the Fresnel type kinoform includes a kinoform reducing the modulated light in diameter toward the first lens.

Alternatively, the light irradiation device may be configured such that the Fresnel type kinoform includes a kinoform expanding the modulated light in diameter toward the first lens.

Further, the light irradiation device may be configured such that the Fresnel type kinoform is a kinoform making a shape of the modulated light on the irradiation object a circular shape, a rectangular shape, or a linear shape.

INDUSTRIAL APPLICABILITY

The present invention is applicable as a light irradiation apparatus capable of easily changing the irradiation position of modulated light in the optical axis direction.

REFERENCE SIGNS LIST 1A to 1E—light irradiation device, 10—light source, 12—front optical system, 20—spatial light modulator, 20a—phase modulation plane, 30A, 30B—(both-sided telecentric) optical system, 31—front lens, 32, 33—rear lens, 40—control section, 40A to 40C—observation optical system, 41—beam splitter, 42, 46—image acquisition sensor, 43, 44—imaging lens, 45—objective lens, 50—stage, B—irradiation object, F1—target plane, L1—readout light, L2, L3—modulated light, L4—optical image.

The invention claimed is:

1. A light irradiation apparatus for irradiating an irradiation object with light, comprising:
    a light source configured to output light;
    a spatial light modulator comprising a phase modulation plane including a plurality of two-dimensionally arrayed regions, and configured to modulate the light in phase in each of the plurality of regions to output modulated light;
    a controller configured to output a control signal to the spatial light modulator; and
    a both-sided telecentric optical system comprising a first lens and a second lens, and optically coupling the phase modulation plane and an irradiation object, the first lens being optically coupled between the phase modulation plane of the spatial light modulator and the second lens, and the second lens being optically coupled between the first lens and the irradiation object, and a distance between the second lens and the irradiation object is configured to remain constant, wherein
    an optical distance between the phase modulation plane and the first lens is substantially equal to a focal length of the first lens, and
    the controller is configured to control a light condensing position of the modulated light in an optical axis direction based on the control signal.

2. The light irradiation apparatus according to claim 1, wherein the controller is configured to control an intensity of the modulated light on the light condensing position.

3. The light irradiation apparatus according to claim 1, wherein the controller is configured to control a size of the modulated light on the light condensing position.

4. The light irradiation apparatus according to claim 1, wherein the controller is configured to control a shape of the modulated light on the light condensing position.

5. The light irradiation apparatus according to claim 1, wherein the second lens is an objective lens.

6. The light irradiation apparatus according to claim 1, wherein the controller is configured to generate the control signal based on a Fresnel type kinoform.

7. A microscope comprising:
    the light irradiation apparatus according to claim 1; and
    an image sensor configured to capture an image of the irradiation object.

8. A laser processing device comprising:
    the light irradiation apparatus according to claim 1, wherein the light source is configured to output laser light.

9. A light irradiation method for irradiating an irradiation object with light, comprising:
    by a spatial light modulator comprising a phase modulation plane including a plurality of two-dimensionally arrayed regions, modulating light in phase in each of the plurality of regions based on a control signal to output modulated light;
    by a both-sided telecentric optical system comprising a first lens and a second lens, and optically coupling the phase modulation plane and an irradiation object, the first lens being optically coupled between the phase modulation plane of the spatial light modulator and the second lens, and the second lens being optically coupled between the first lens and the irradiation object, and a distance between the second lens and the irradiation object is configured to remain constant, irradiating the irradiation object with the modulated light, wherein an optical distance between the phase modulation plane and the first lens is substantially equal to a focal length of the first lens; and
    controlling a light condensing position of the modulated light in an optical axis direction by the modulating.

10. The light irradiation method according to claim 9, further comprising controlling an intensity of the modulated light on the light condensing position by the modulating.

11. The light irradiation method according to claim 9, further comprising controlling a size of the modulated light on the light condensing position by the modulating.

12. The light irradiation method according to claim 9, further comprising controlling a shape of the modulated light on the light condensing position by the modulating.

13. The light irradiation method according to claim 9, wherein the modulating is controlled based on a Fresnel type kinoform.

* * * * *